Oct. 3, 1967     G. M. TURNER     3,344,876
REAMER
Filed April 13, 1965
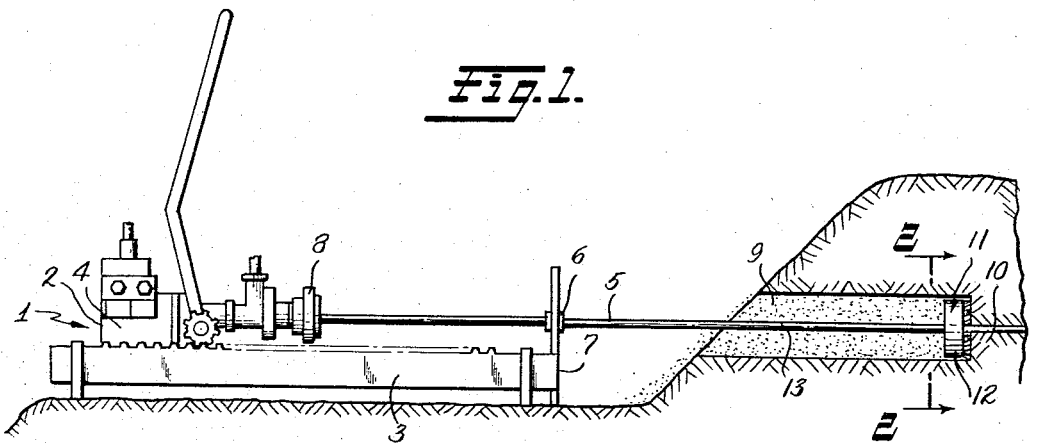
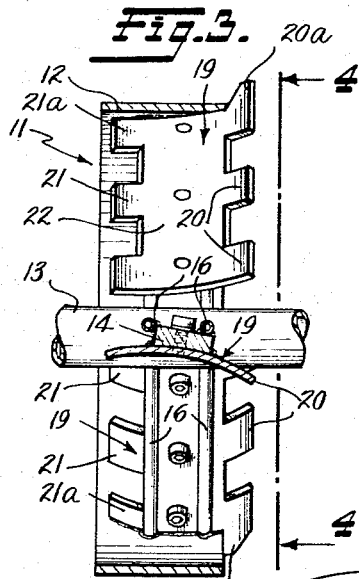
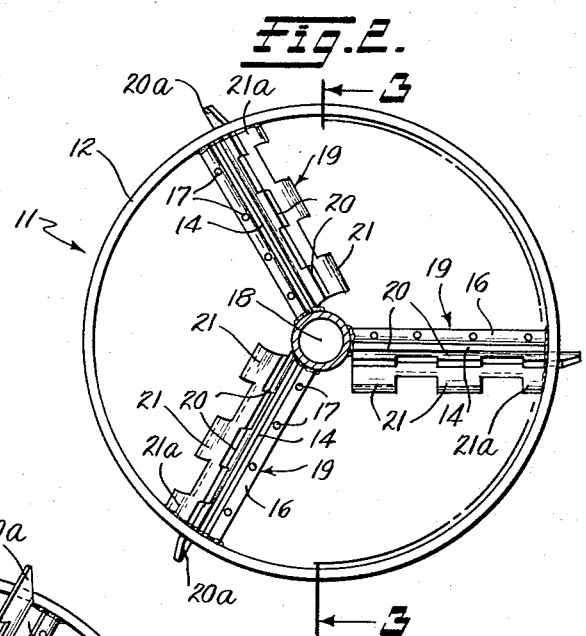
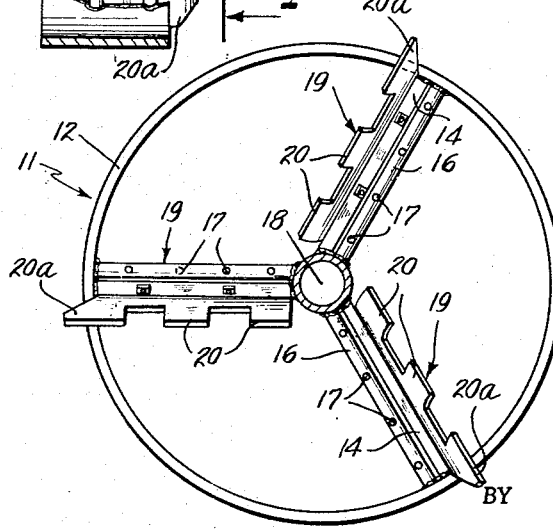
INVENTOR
Gilbert M. Turner
BY Arnold & Roylance
ATTORNEYS United States Patent Office 3,344,876
Patented Oct. 3, 1967

3,344,876
REAMER
Gilbert M. Turner, 806 Chowning Road,
Houston, Tex. 77024
Filed Apr. 13, 1965, Ser. No. 447,806
5 Claims. (Cl. 175—401)

ABSTRACT OF THE DISCLOSURE

An open type reamer for drilling horizontal holes is provided with a central shaft, an outer rim, and a plurality of support plates extending radially from said central shaft connecting the shaft to the outer rim. Curved blades are affixed to the support plates, each blade having two rows of teeth. The reamer teeth are effective for cutting in both the forward and reverse directions while the drill stem is rotated in the forward direction.

This invention relates to a reamer which is particularly useful in drilling horizontal holes. More particularly, it relates to a reamer of a specific construction which has teeth facing in each forward and rearward directions. Further, the blades containing the teeth are curved in such a manner as to facilitate cutting in both the forward and the reverse directions while the drill stem is rotated in the forward direction.

Horizontal earth excavation employing open-type reamers has become a well-known and highly important art. Such processes as those described in Horner U.S. Patent No. 2,702,180 and Turner U.S. Patent No. 3,011,567, for instance, have become highly important in the earth-boring industry. Such processes have exceptional utility in boring or tunneling under roads, highways, railroads and other obstructions, and in laying pipelines, for example.

As described in each of the above patents, the open-type reamers used in the past have included teeth facing in one direction only. That is, the teeth were usually facing in the direction of reaming; but it was also known to use a so-called "reverse reamer" in which the teeth were pitched opposite from the forward reamer, such a reverse reamer being illustrated in FIGURE 9 of the above-mentioned Turner patent. But so far, no one has been able to successfully develop a tool which employed both front and rear teeth. The reason such a tool has not been successfully developed is that it has been heretofore believed that, in order to get the necessary pitch for the front teeth, teeth placed on the rear would not only be ineffective as cutters (unless the rotation of the reamer could be reversed without unscrewing the drill stem, which is impractical), but would also act as a drag and hinderance if the reamer were to be used as a compacting tool as outlined in Horner U.S. Patent No. 2,702,180. Or, in the case of a reverse reamer, the front teeth would function similarly and thus merely hinder operation of the reamer.

It has now been discovered, however, that by curving the blade on which the teeth are located, both front and rear teeth will function surprisingly well.

Accordingly, this invention seeks to provide an open-type reamer having both front and rear cutting teeth. Further, this invention seeks to provide a reamer having the cutting teeth positioned on a gently curving blade. Still further, this invention seeks to provide an improved method of horizontal drilling wherein an open-type reamer may be used for cutting in the forward direction, and the same reamer may be used for cutting in the backward direction while the drill stem is rotated in the same direction.

In accordance with these and other objects of this invention, one preferred embodiment of the invention is hereinafter described. This embodiment may be more clearly understood through reference to the accompanying drawings, which form a part of this specification, and wherein:

FIGURE 1 is a side elevation of a typical horizontal drilling machine incorporating one embodiment of a reamer in accordance with the concept of the present invention.

FIGURE 2 is an enlarged sectional view taken along the line 2—2 of FIGURE 1.

FIGURE 3 is a vertical elevation in partial section of the reamer shown in FIGURE 2, taken along the line 3—3 of FIGURE 2.

FIGURE 4 is a vertical elevation in partial section of the reamer shown in FIGURES 2 and 3, taken along the line 4—4 of FIGURE 3.

In FIGURE 1 is illustrated a typical horizontal drilling machine 1 which may be used in accordance with this invention, but it is herein pointed out that a number of machines and devices can fulfill the same function. Such a machine 1 has a frame 2 which supports racks 3. The engine 4 is mounted on a guide base, not shown, which is adapted to slide along the racks 3. The engine 4 is connected to rotate the drill stem 5, and the steady rest 6 on the frame 2 supports the drill stem 5, at the end 7 of the frame, while the bearing member 8, also mounted on the frame, supports the drill stem centrally of the frame. Reamer 11 is rotatably mounted on drill stem 5 and guide 10, and is adapted to drill bore hole 9.

The open-type reamer 11 illustrated in these figures comprises an outer rim 12 of hollow cylindrical configuration fixedly attached to a central shaft 13 of generally cylindrical configuration by a plurality of plates 14. Central shaft 13 has an externally threaded connection at one end thereof so that the shaft may be connected to rotatable drill stem 5 or guide 10, and is internally threaded at its other end also for connection to drill stem 5 or guide 10. It is understood, of course, that a suitable drill stem 5 may be rotated by engine 4, and guide 10 is preferably included in order to facilitate passage of the reamer through a pilot hole. Reference may be had to Turner U.S. Patent No. 3,011,567, where these and other features are illustrated in greater detail.

Plates 14 are oriented at a slight angle with a plane passing through the diameter of the reamer (through the center of the central shaft) parallel to the elongated central shaft. An angle of 8–22° has been found satisfactory, with about 10° being preferred. It is noted that while three plates 14 are illustrated in the embodiment here described, any suitable number might be used, with three being merely the preferred number.

Pipes 16 are affixed to plates 14, each of these pipes having a plurality of orifices 17 therein. Fluid on the inside of the drill stem in the area shown at 18 may flow into these pipes 16 and out the orifices 17. When, for instance, water is allowed to flow through the orifices, the earth in the area of the cuttings is lubricated. While the position of the orifices is not critical, it is preferred that they be located so as to be protected as much as possible from clogging.

Securely affixed, as for example by bolts, to plates 14 are blades 19 having thereon front teeth 20 and rear teeth 21. Blades 19 have a slight curvature in order to facilitate cutting in both the frontward and backward directions. These blades may be constructed of arcuate sections, for instance of pipe. The radius of curvature of these arcuate sections found to be useful is from about 3 inches to about 10 inches. Most preferred is a radius of curvature of about 5 inches.

Blades 19 must be of heavy, durable construction. For instance, they may be constructed of hard steel of about ⅜ inch thickness. It is preferred that the cutting surface 22 of blades 19 be unobstructed, and for this reason these blades should be affixed to the plates 14 in such a manner as to insure that this surface is flush. As is illustrated in the accompanying drawings, it may be preferred to have the outside tooth 20a of teeth 20 and the outside tooth 21a of teeth 21 constructed so that these outside teeth extend radially beyond the outside surface of the cylindrical rim 12. This will usually mean, of course, that these outside teeth will be slightly larger than the other teeth in the series. It is emphasized however that it is not the exact number of the teeth or the relative size of the teeth that is critical. Rather, it is the curvature of the teeth occasioned by the curvature of the blade on which they are situated.

In operation, it will be understood that the reamer is rotated on its rotatable drill stem, generally in a clockwise direction. In the forward direction, which is the usual direction of movement, the earth ahead of the reamer is cut by the advance front teeth in a manner much as soil is furrowed by a turning plow. Of course, it is understood that water may be injected into the drill stem and through pipes 16 and out orifices 17 to lubricate the earth as it is being cut. It is also understood that any other fluid, such as compressed air, may be ejected through the orifices 17 in order to, for example, force the cuttings from the borehole as is described in the aforementioned patents to Horner and Turner.

When the reamer is retracted and while the drill stem is still rotated in the clockwise direction, the earth behind the reamer is cut by the rear teeth. Of course, it is usually desirable to so arrange the pitch of plates 14 and the curvature of blades 19 so that the most efficient cutting is in the forward direction, for the reason that the majority of the cutting is in that direction. However, it is found that, with the pitch and curvature suggested herein, the rear teeth are also surprisingly efficient.

An open-type reamer constructed in accordance with this invention can be reversed through a certain distance and then allowed to drill forwardly through that area in about half the time the reamers of the prior art could be reversed and then drill forwardly through the same area; therefore, the importance of this improvement in facilitating the recutting and relubricating of the soil cuttings to cause them to be a more lubricated and homogeneous mass for subsequent removal can easily be recognized.

While the invention has been described in terms of one particularly useful embodiment, it will be understood that various equivalents may be used without departing from the scope of this invention as defined by the following claims.

I claim:
1. An open-type reamer useful in drilling horizontal holes comprising:
an elongated central shaft,
a plurality of support plates extending radially from said central shaft and fixedly connecting said shaft to an outer rim of generally hollow cylindrical configuration,
wherein each of said support plates has affixed thereto a curved blade, said blade having therein two rows of teeth generally parallel to said radial support plate, said rows being located on opposite sides of said blades.
2. An open-type reamer useful in drilling horizontal holes comprising:
an elongated central shaft;
a plurality of support plates extending radially from said central shaft and fixedly connecting said shaft to an outer rim of generally hollow cylindrical configuration;
wherein each of said support plates has affixed thereto an arcuate blade,
said arcuate blade having therein a first row of teeth parallel to said support plate and on one edge of said arcuate blade, and a second row of teeth parallel to said support plate and on the opposite edge of said arcuate blade.
3. A reamer in accordance with claim 2 wherein each of said support plates is inclined at an angle of from about 8° to about 22° with a plane passing through the center of said central shaft and parallel to said shaft.
4. A reamer in accordance with claim 3 wherein said central shaft is of generally cylindrical configuration.
5. A reamer in accordance with claim 2 wherein the radius of curvature of said arcuate blade is from about 3 inches to about 10 inches.

References Cited

UNITED STATES PATENTS

| Re. 24,965 | 4/1961 | Kirkpatrick | 175—62 X |
| 1,812,719 | 6/1931 | Schroder | 299—90 X |
| 1,848,762 | 3/1932 | Atkinson | 175—406 |
| 2,234,451 | 3/1941 | Ransome | 175—401 |
| 2,450,223 | 9/1948 | Barbour | 175—406 X |
| 2,680,597 | 6/1954 | Brown | 175—413 |
| 2,684,834 | 7/1954 | Miller | 175—413 |
| 2,693,345 | 11/1954 | Martin | 175—421 X |
| 3,011,567 | 12/1961 | Turner | 175—62 X |

CHARLES E. O'CONNELL, *Primary Examiner.*

N. C. BYERS, JR., *Assistant Examiner.*